(12) United States Patent
Blanc et al.

(10) Patent No.: US 8,811,807 B2
(45) Date of Patent: Aug. 19, 2014

(54) BOILER FOR A MACHINE FOR MAKING HOT BEVERAGES

(75) Inventors: Jean-Pierre Blanc, Nice (FR); Alain Goering, Nice (FR)

(73) Assignee: Compagnie Mediterraneenne des Cafes (SA), Carros (FR)

( * ) Notice: Subject to any disclaimer, the term of this patent is extended or adjusted under 35 U.S.C. 154(b) by 732 days.

(21) Appl. No.: 13/001,143

(22) PCT Filed: Jan. 15, 2009

(86) PCT No.: PCT/EP2009/050438
§ 371 (c)(1),
(2), (4) Date: Apr. 12, 2011

(87) PCT Pub. No.: WO2009/156190
PCT Pub. Date: Dec. 30, 2009

(65) Prior Publication Data
US 2011/0174160 A1 Jul. 21, 2011

(30) Foreign Application Priority Data
Jun. 27, 2008 (FR) ...................... 08 54348

(51) Int. Cl.
*A47J 31/44* (2006.01)
(52) U.S. Cl.
USPC .............................. 392/467; 219/538; 99/288
(58) Field of Classification Search
CPC ......... A47J 31/542; H05B 3/50; F24H 1/121; F24H 9/02
USPC .................. 392/479, 473, 480; 219/441, 439, 219/448.11, 465.1, 504, 553; 99/288
See application file for complete search history.

(56) References Cited

U.S. PATENT DOCUMENTS

| 4,177,375 A * | 12/1979 | Meixner ........................ 219/441 |
| 4,482,801 A * | 11/1984 | Habata et al. .................. 219/540 |
| 2003/0044173 A1* | 3/2003 | Natsuhara et al. ............. 392/479 |
| 2007/0012685 A1 | 1/2007 | Gourand |

FOREIGN PATENT DOCUMENTS

| DE | 19847670 | 4/1999 |
| EP | 1293597 | 3/2003 |
| FR | 2855359 | 11/2004 |
| GB | 2330402 | 4/1999 |

OTHER PUBLICATIONS

International search report dated May 28, 2009 in corresponding PCT/EP2009050438.

* cited by examiner

*Primary Examiner* — Jianying Atkisson
(74) *Attorney, Agent, or Firm* — Young & Thompson

(57) ABSTRACT

A boiler for use in a machine for making hot beverages includes a heat diffuser with a first wall destined to be placed in contact with the liquid to be heated and a second wall opposite first wall, heating element consisting of at least one serigraphed or photo-engraved resistance arranged on second wall of heat diffuser and defining a pattern formed of at least on resistive track, a body which with first wall of heat diffuser defines a heating chamber inside which the liquid is to be heated. It also includes a bearing element shaped to bear on second wall of heat diffuser on at least one zone, the resistive track(s) being arranged on either side of the zone so that the bearing element receives at least part of the force transmitted by the liquid to heat diffuser and resulting from the pressurizing of liquid in the heating chamber.

20 Claims, 15 Drawing Sheets

BOILER FOR A MACHINE FOR MAKING HOT BEVERAGES

FIELD OF THE INVENTION

The present invention concerns a boiler for use in a machine for making hot beverages. It will find an application in particular on coffee machines.

BACKGROUND OF THE INVENTION

Boilers for preparing hot beverages comprising a metal block forming a heating chamber in which is embedded a heating resistance constitute already known art. The disadvantage of these boilers is their considerable thermal inertia and the relatively long period of time required to heat the liquid. Moreover, these boilers involve high material procurement costs.

In order to obtain a hot drink quickly, boilers have been proposed that are capable of quickly raising the temperature of a liquid for making the beverage. These boilers usually include a heater with a high power density heating element of the serigraphed resistance type associated with a heat diffuser.

However these boilers are not used to prepare drinks that require substantial pressurizing of the liquid. Indeed, they are unable to withstand the relatively high pressures of around 8 to 10 bars while achieving limited costs and dimensions. However, the preparation of certain drinks such as expresso coffee requires that the liquid be brought to a pressure of around 16 bars in order to extract the coffee.

Thus, there is a need to propose a boiler for use on machines for preparing hot drinks that will bring liquid to a high-pressure quickly while ensuring that its cost and dimensions remain limited.

The aim of the present invention is to meet this need.

SUMMARY OF THE INVENTION

To do this, the present invention describes a boiler for use in machines for preparing hot beverages consisting of a heat diffuser with a first wall designed to be placed in contact with the liquid to be heated and a second wall opposite the first, the heating means consisting of at least one serigraphed or photo-engraved resistance arranged on the second wall of the heat diffuser and forming a pattern of at least one resistive track, a body defining with the first wall of the heat diffuser a heating chamber inside which the liquid is to be heated. It also includes bearing means, also designated support means, shaped to bear on at least one zone of the second wall of the heat diffuser. This zone is arranged so that the resistive track(s) that form the pattern are positioned on either side of this zone so that the bearing means absorbs at least some of the force transmitted by the liquid to the heat diffuser when the pressure of the liquid builds up inside the heating chamber.

Thus, the liquid inside the heating chamber may reach a relatively high pressure without the heat diffuser having to absorb all the forces generated by this pressure. This eliminates the need for sturdy and thick heat diffusers. Therefore, the invention brings greater flexibility when designing the heat diffusers. In particular, heat diffusers can be selected with dimensions and/or materials that improve the thermal conduction between the serigraphed or photo-engraved resistance and the liquid to be heated.

Optionally, but nevertheless advantageous, the invention may present any one of the following characteristics:

- the bearing means has a form that appreciably complements the serigraphed or photo-engraved resistance so that it comes into contact with the first wall of the heat diffuser without interfering with the resistive tracks.
- the bearing means is arranged to be in contact with approximately 50 to 98% of the surface of the second wall that is not occupied by the serigraphed or photo-engraved resistance.
- the bearing means is arranged to be in contact with at least 70% of the surface of the second wall that is not occupied by the serigraphed or photo-engraved resistance.
- the bearing means is arranged to be in contact with roughly 50% to 98% of the surface of the second wall that is not occupied by the serigraphed or photo-engraved resistance.
- the bearing means is arranged to be in contact with almost all the surface of the second wall that is not occupied by the serigraphed or photo-engraved resistance.
- the heat diffuser is between 2 and 4 mm thick, the pattern defines a surface area that is between 60% and 90% of the heat diffuser and any interaction between the bearing means and the body enable the pressure of the liquid in the boiler to reach approximately 30 bars.
- the device is equipped with a support that acts as a frame to receive the bearing means.
- the support and the bearing means constitute a single part.
- the bearing means fits into the support.
- the support forms an integral part of the body.
- the heating chamber is positioned on the periphery of the heating means and the heating means are positioned on the periphery of the bearing means.
- the heating means are situated on the periphery of the heating chamber and the bearing means is positioned on the periphery of the heating means so as to enclose the latter.
- the heating means are appreciably cylindrical.
- the section of the heating means along the cylinder axis is appreciably circular.
- the section of the heating means along the cylinder axis is appreciably polygonal and preferably square.
- the boiler includes at least two distributors, the second walls of which are turned to face one another and enclose the bearing means.
- the heat diffuser is appreciably flat.
- the support has at least one central zone in which is situated the bearing means and which is destined to receive the heat diffuser and at least one peripheral zone situated on the periphery of the central zone and by which the body is joined to the support.
- the support is symmetrical on a mid-plane
- the boiler is symmetrical on a mid-plane.
- the boiler includes a heat diffuser between 2 and 4 mm thick. This thickness encourages conductivity without leading to an inertia that is too high due to the metal mass.

The surface of the serigraphed resistance, that is to say the developed length of the track multiplied by the width of the track, represents from 30 to 60% of the total surface area of the heat diffuser. This enables power densities from 15 to more than 40 watt/cm$^2$ to be achieved.

The peripheral surround of the pattern defines a surface area that is between 60 and 90% of the total surface area of the second wall of the heat diffuser. In the example illustrated, this surround is formed by the square within which the coiled pattern is inserted.

In this example, the peripheral circumference of the pattern defines a surface area that extends over 75% of the total surface area of the second wall of the heat diffuser. Interaction between the bearing means and the body authorizes a pressure of the liquid in the boiler to build up to around 30 bars with a safety margin of more than 30% relative to the ultimate tensile strength of the materials used.

the boiler includes electrical means for establishing an electrical connection between the serigraphed or photo-engraved resistance and a power supply.

it is arranged so that the pressurized liquid is positioned on both sides of the bearing means so that the force generated by the pressure of the liquid is transmitted to the bearing means and balances at the level of the bearing means. Thus, the forces generated by the pressure are relayed onto the body.

it includes two heat diffusers, the bearing means being positioned between the second walls of each one of the heat diffusers.

The invention also covers an assembly consisting of a boiler according to any one of the preceding characteristics and a pump to increase the pressure of the liquid before it is injected into the boiler. The invention also concerns a coffee machine comprising such a boiler.

BRIEF DESCRIPTION OF THE DRAWINGS

Other characteristics, aims and advantages of the present invention will be apparent on reading the detailed description which follows, and by consulting the appended drawings given as non-restrictive examples and on which.

DETAILED DESCRIPTION OF THE INVENTION

Figure 1:
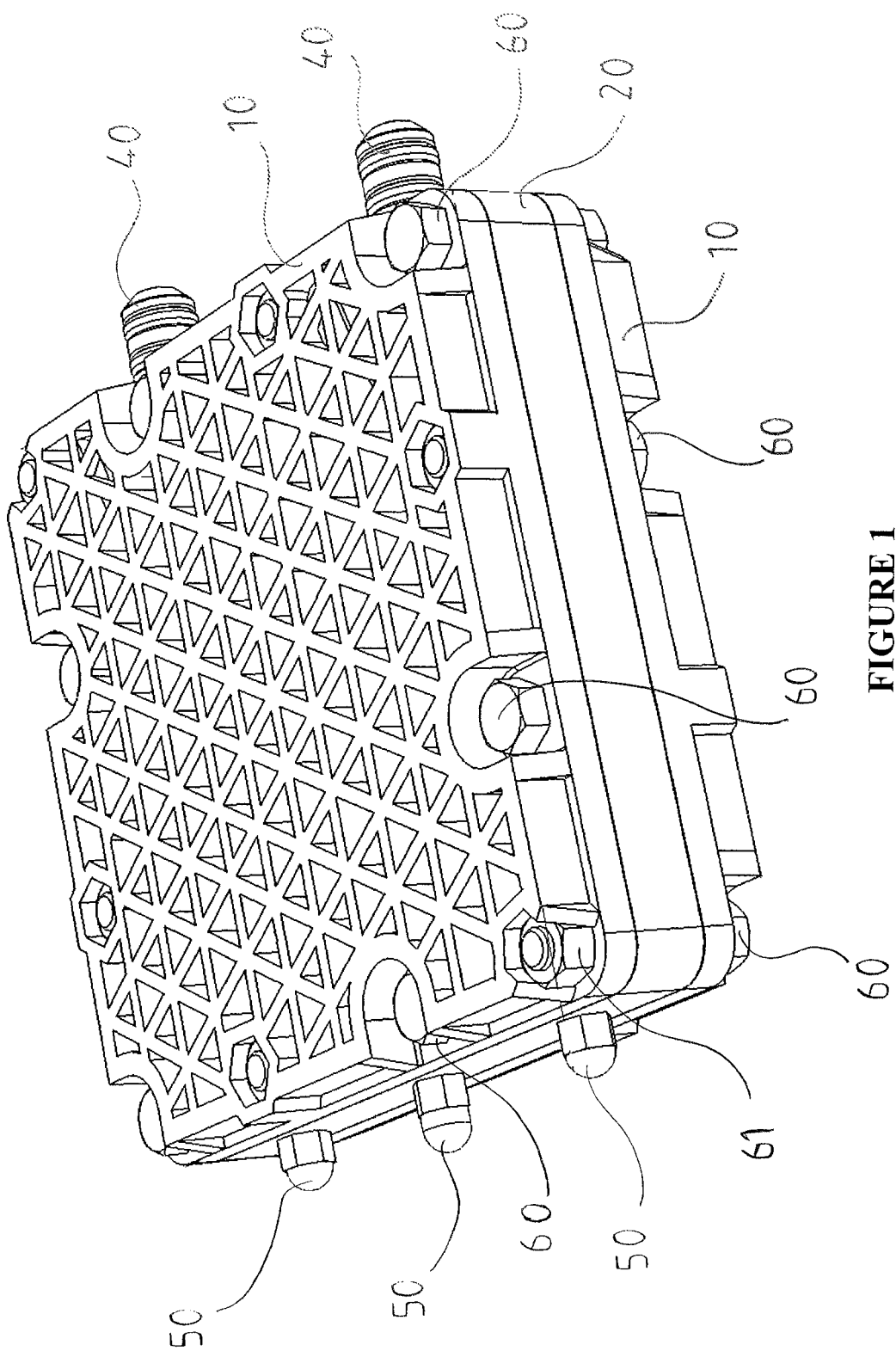
FIG. 1 is a view in perspective of the example of the boiler according to the invention.
Figure 2:
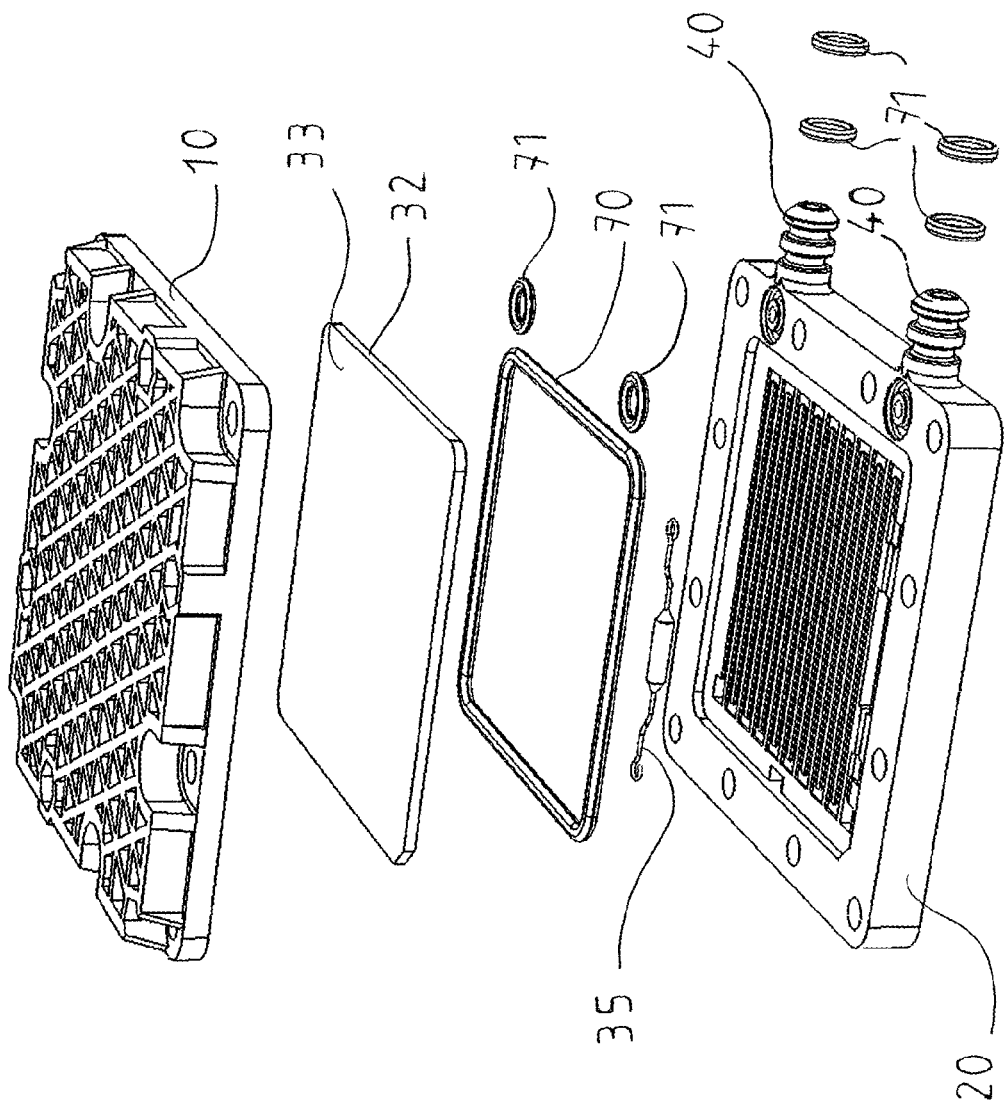
FIG. 2 is an exploded view of part of the boiler according to the example illustrated in FIG. 1.
Figure 3:
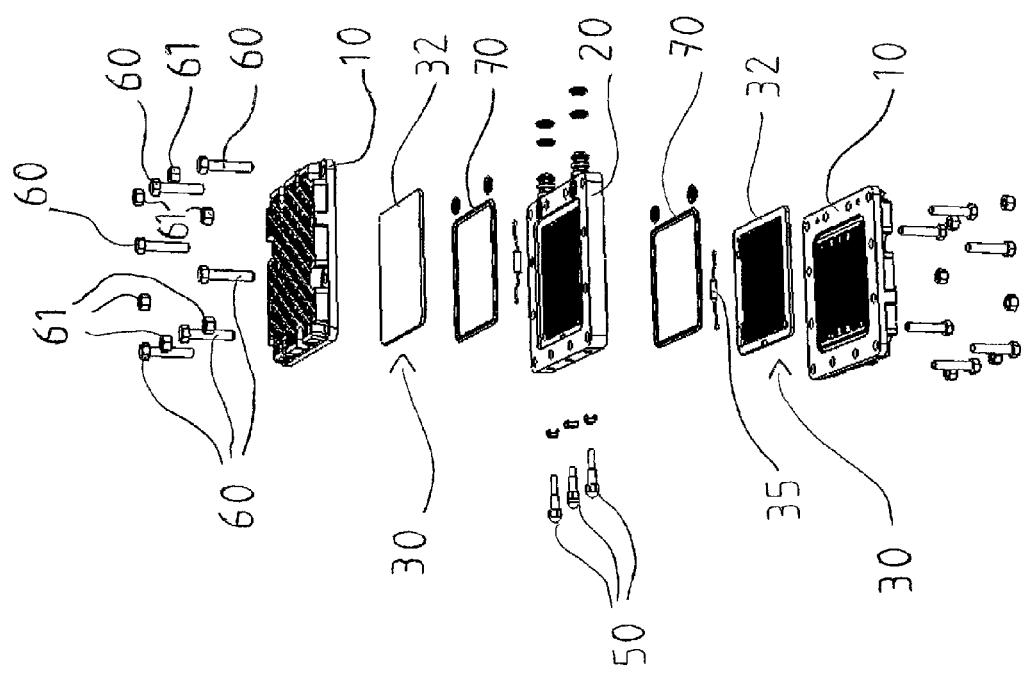
FIG. 3 is an exploded view of part of the boiler according to the example illustrated in FIG. 1.
Figure 4:
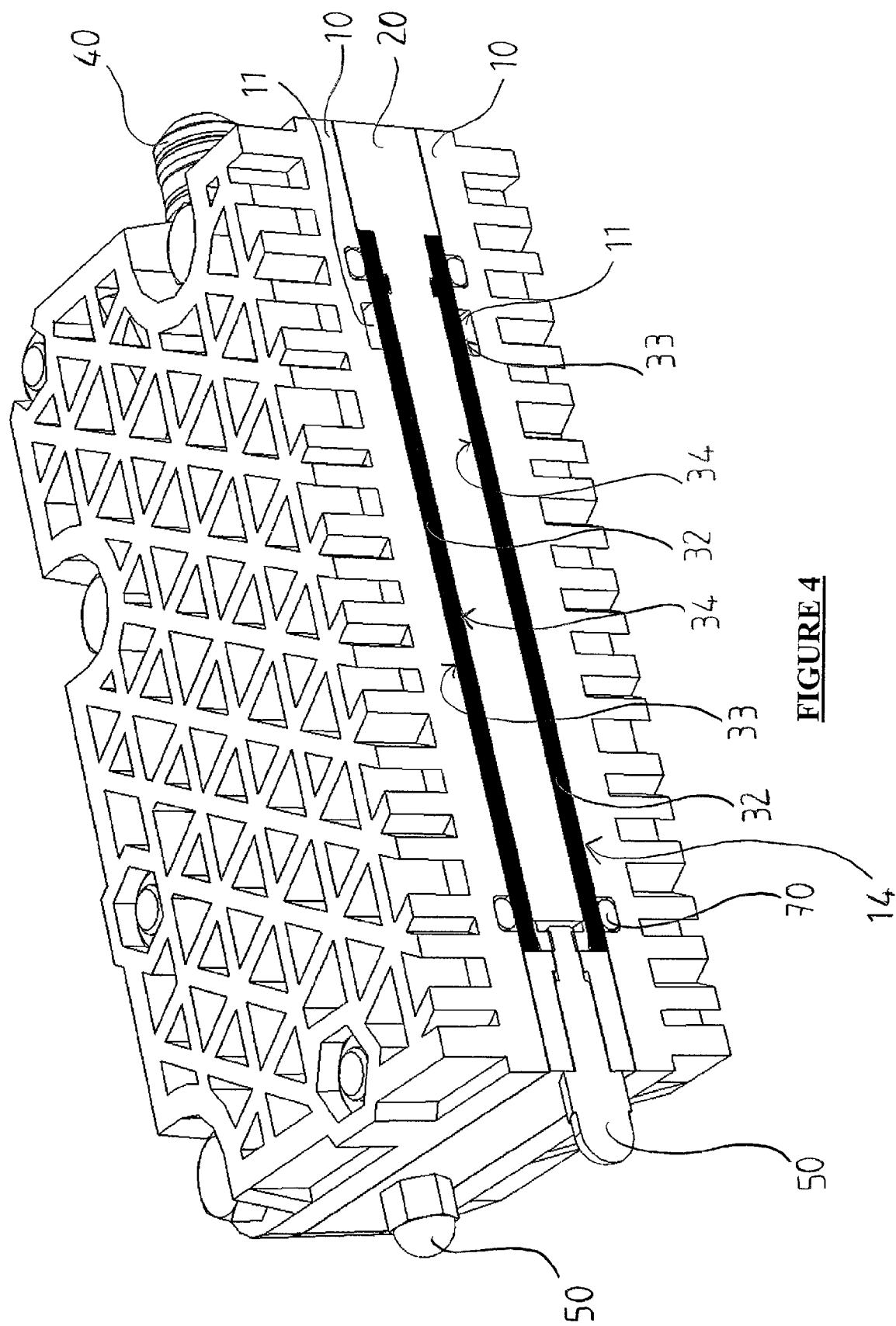
FIG. 4 is a view in perspective of the boiler shown in FIG. 1 according to a section along a median plane.
Figure 5:
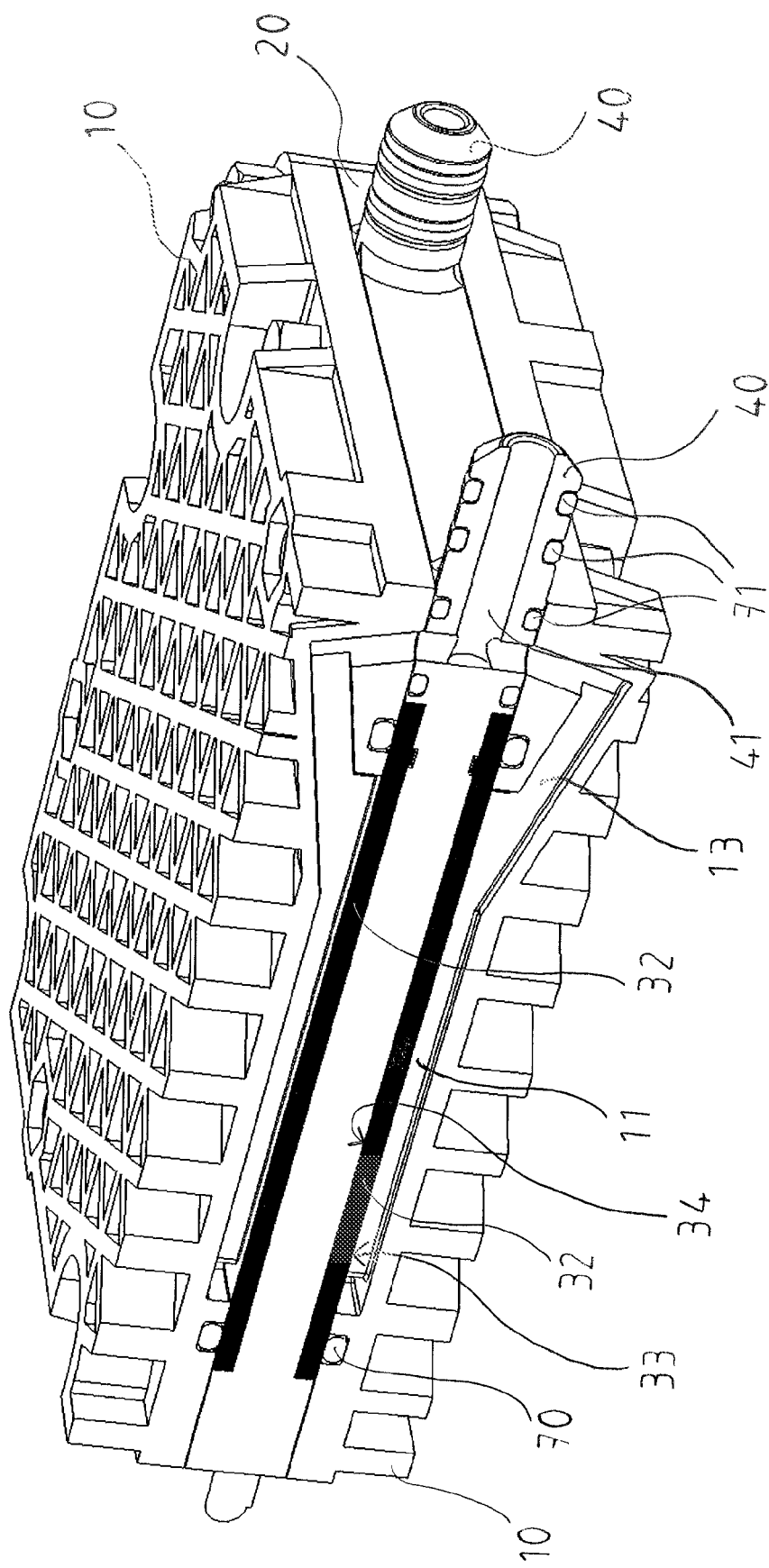
FIG. 5 is a view in perspective of the boiler shown in FIG. 1 according to a section along a plane parallel to the mid-plane of FIG. 4.
Figure 6:
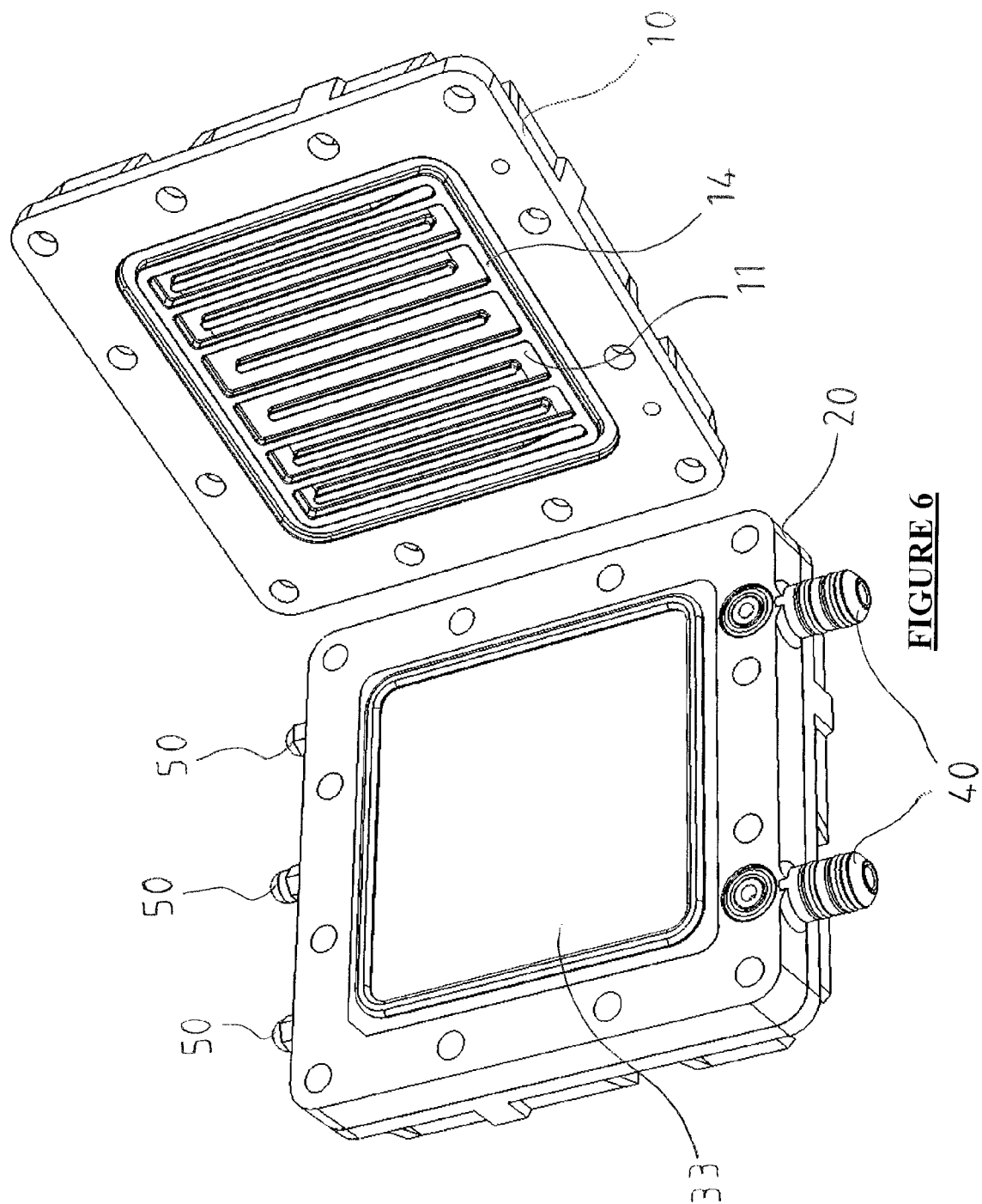
FIG. 6 is a view in perspective of a support, a heat diffuser and a flange according to the example of the boiler shown in FIG. 1.

A non-restrictive embodiment of a boiler according to the invention will now be detailed by referring to FIGS. 1 to 8.

The boiler comprises a body and heating means 30 forming with the body a heating chamber 11 inside which the liquid flows and is heated. More especially, heating means 30 include at least one heat diffuser 32 presenting a first wall 33 destined to come into contact with the liquid to be heated. First wall 33 is destined to come into contact with internal face 14 of the body in order to form heating chamber 11.

In the example shown, heating chamber 11 defines a circulation channel in the form of a coil-shaped circulation channel. As illustrated on FIGS. 6 and 7, this channel presents two cross walls 16, 36 and two side walls 15, 15. A first cross wall 36 is supported by first wall 33 of the distributor and a second cross wall 16 is supported by inner face 14 of the body. Side walls 15, 15 are supported by the body and extend in the direction of heat diffuser 32. This embodiment is preferred when the material of which the heat diffuser is made offers good mechanical performances and/or good thermal conductivity.

Figure 14:
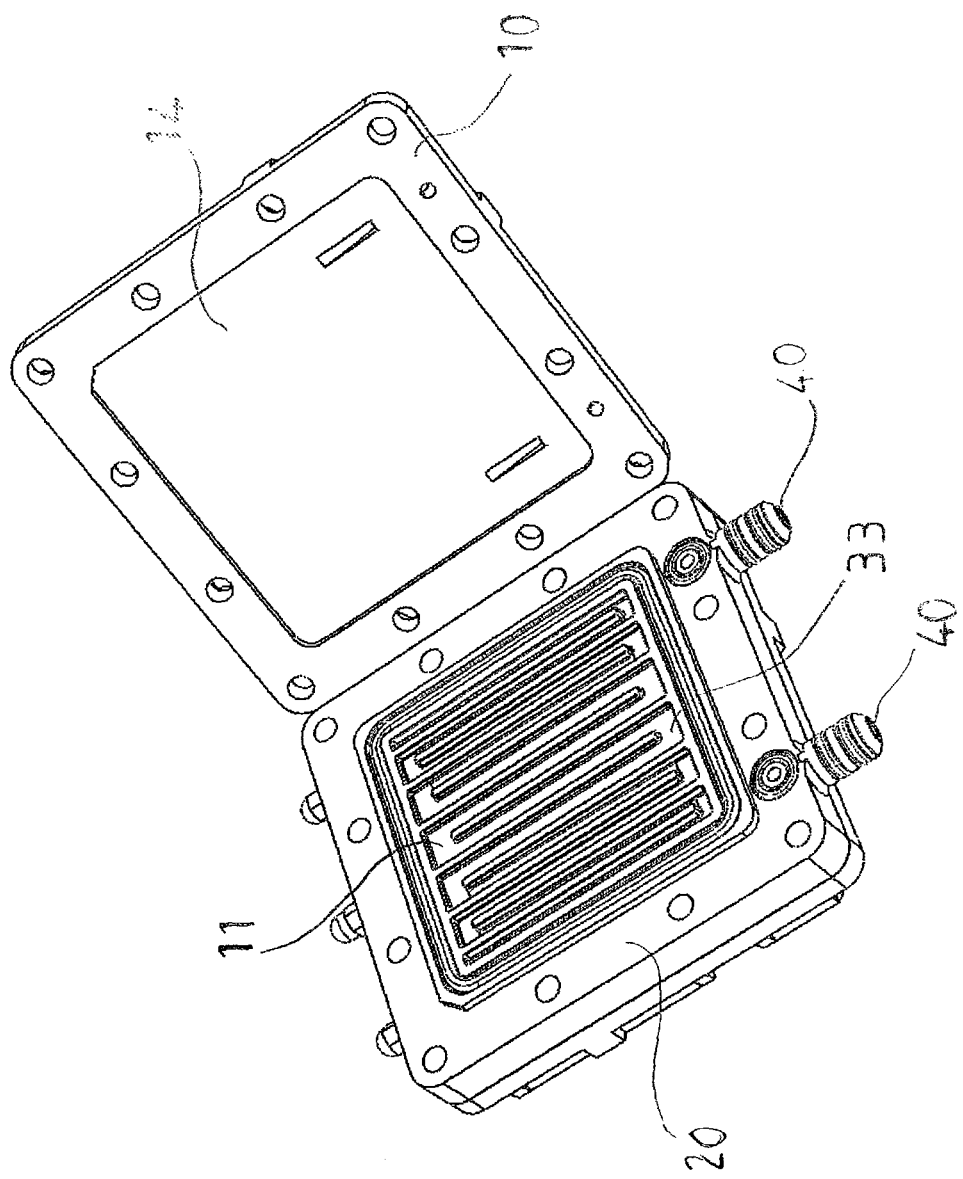
FIG. 14 is an alternative embodiment to the one shown in FIG. 6.
Figure 15:
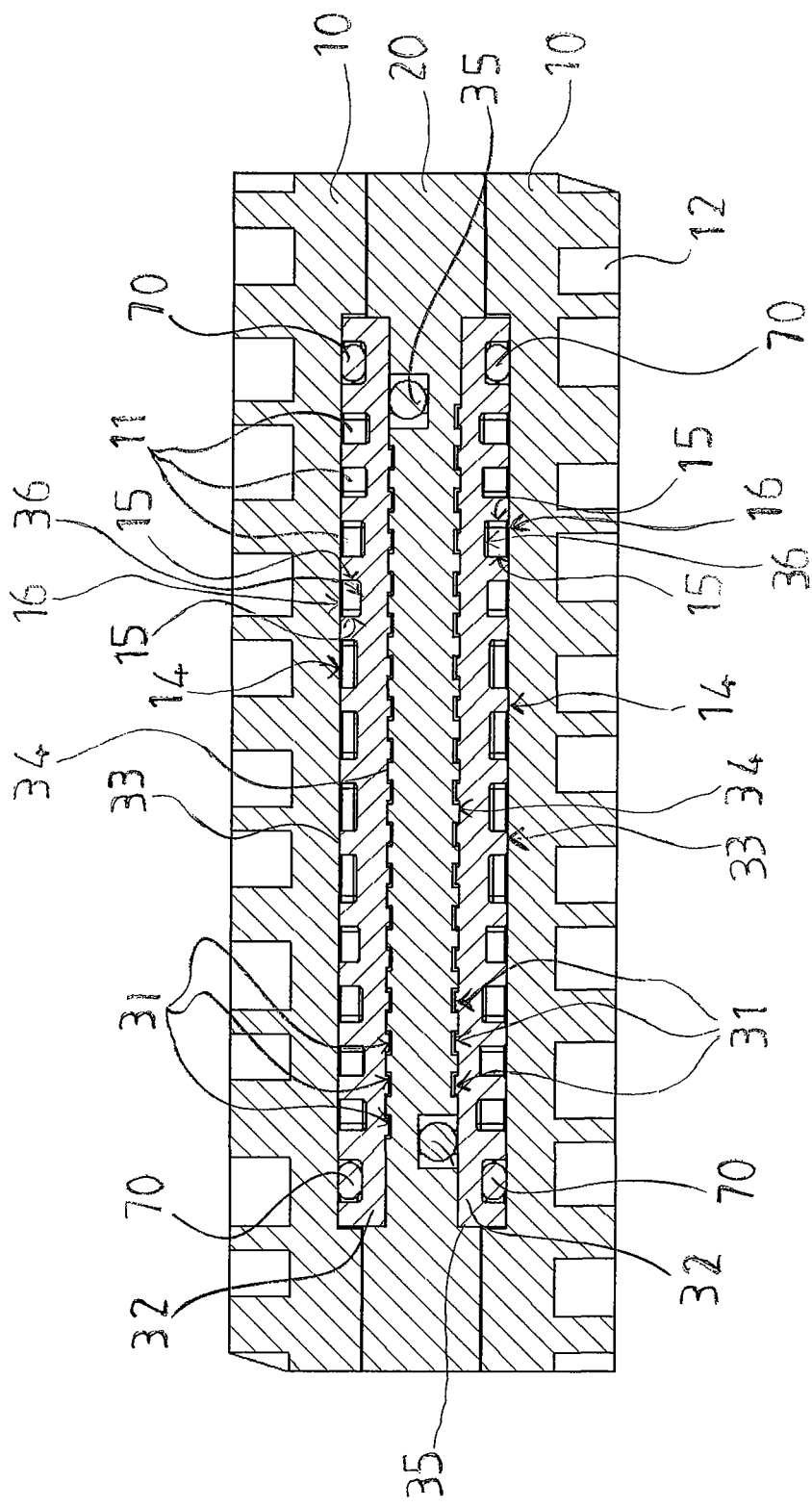
FIG. 15 is an alternative embodiment to the one shown in FIG. 7.

In a variant of the embodiment, side walls 15, 15 are supported by heat diffuser 32. In this variant of the embodiment, the heat diffuser is made of more material than the previous variant. Sidewalls 15, 15 increase the contact surface between heat diffuser 32 and the liquid. This improves heat exchange. Moreover, sidewalls 15, 15 act as ribbing for heat diffuser 32. Therefore, the latter offers better resistance to pressure. This embodiment is therefore preferred when the material from which heat diffuser 32 is made has relatively poor mechanical strength and/or relatively high thermal conductivity. Advantageously, heat diffuser 32 is obtained by die casting or moulding. This embodiment is illustrated in FIGS. 14 and 15.

Heating means 30 comprise at least one resistance placed on second wall 34 of the heat diffuser, second wall 34 being opposite the first wall. Advantageously, this resistance is a serigraphed or photo-engraved resistance. It is made by depositing a resistive ink. For example, it may constitute a thick film, usually designated by the expression "thick film", or be of the printed circuit type, executed by photo-engraving. For reasons of clarity, hereafter reference will only be made to serigraphed products. In each of the embodiments described below, these serigraphed resistance may be replaced by a photo-engraved resistance.

Figure 8:
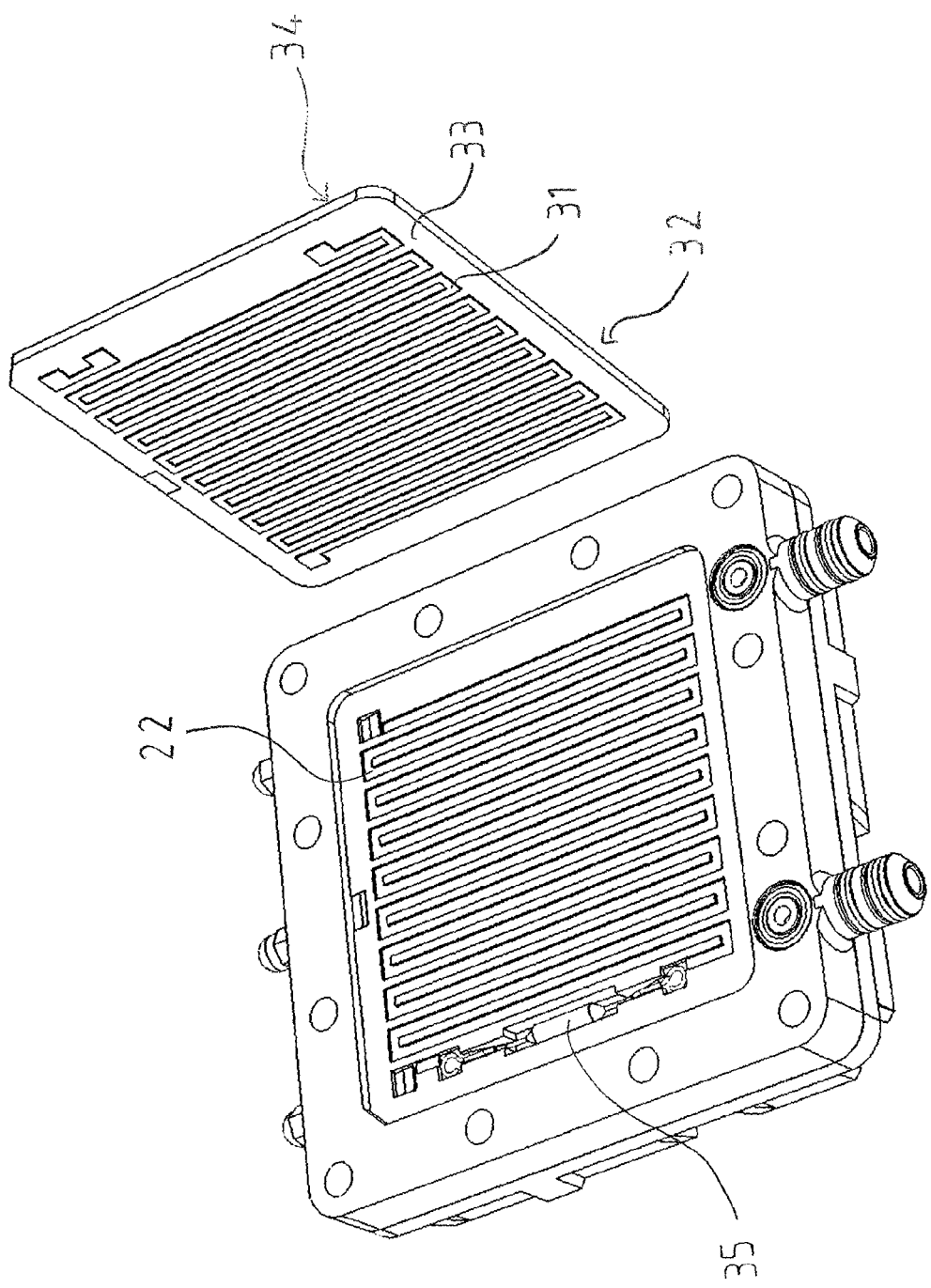
FIG. 8 is a view in perspective of a support, a heat diffuser and a flange according to the example of the boiler shown in FIG. 1.
Figure 9:
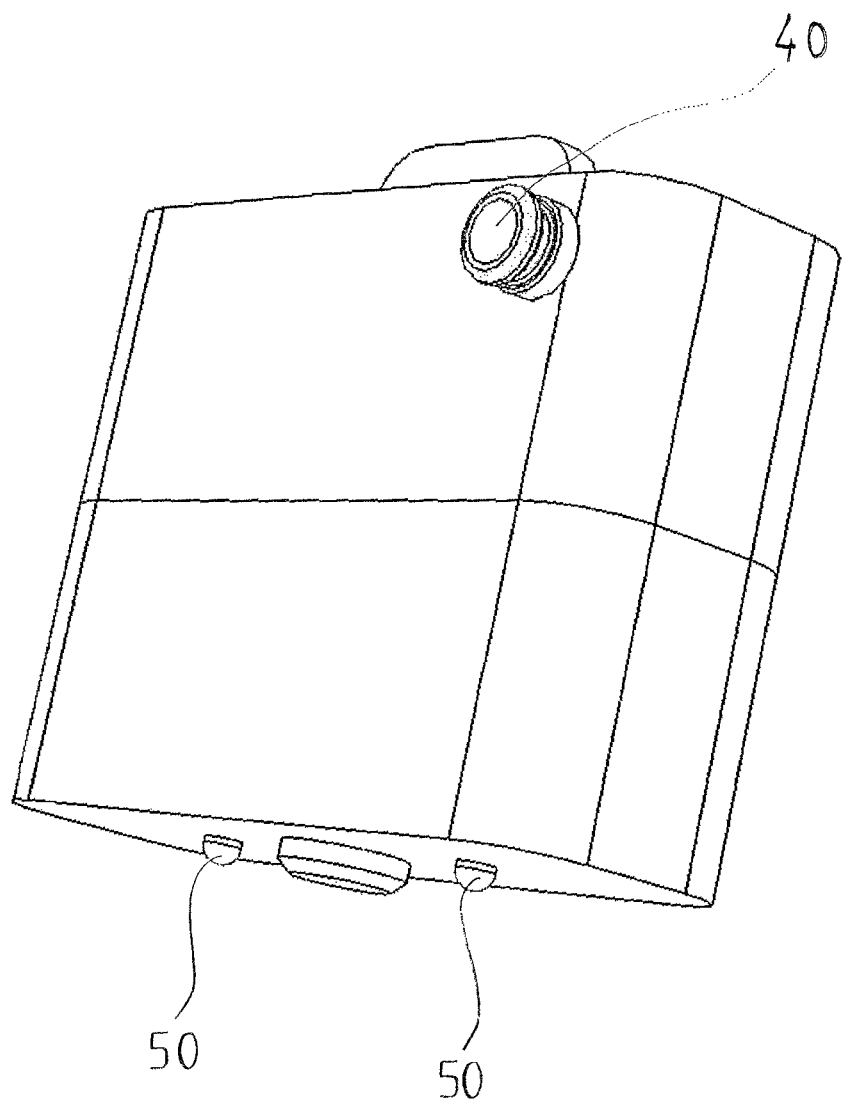
FIGS. 9, 10 and 11 are views in perspective of another example of the invention.
Figure 10:
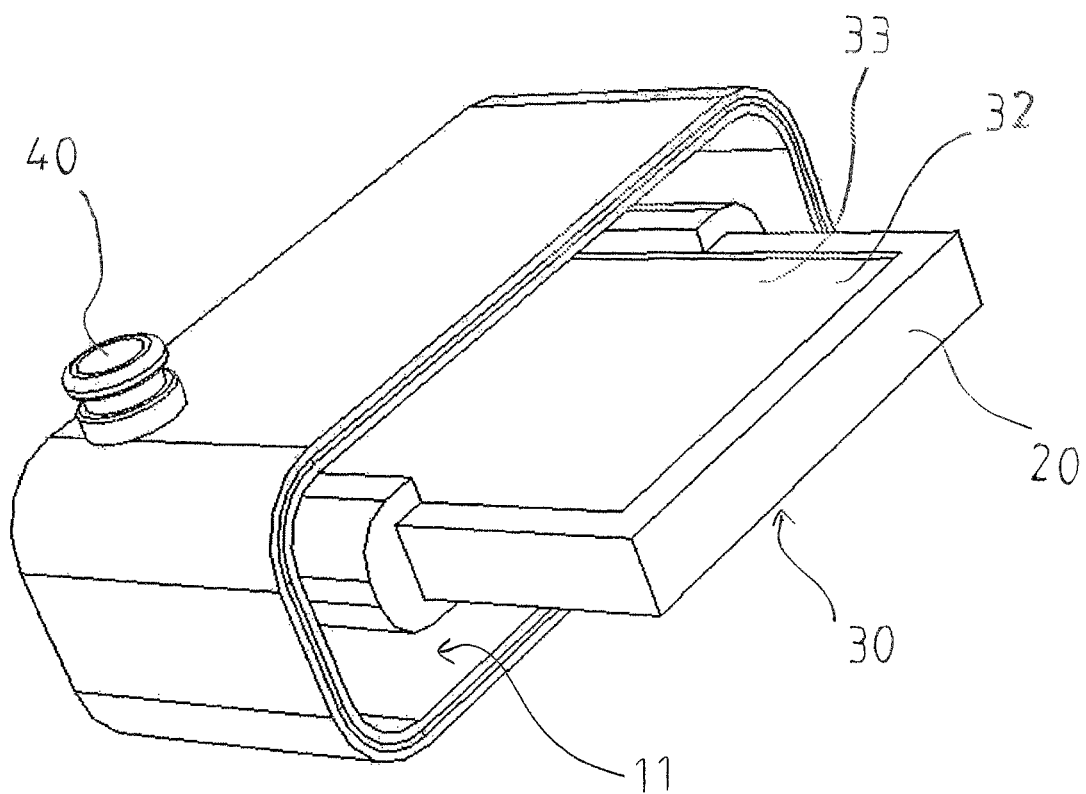
Figure 11:
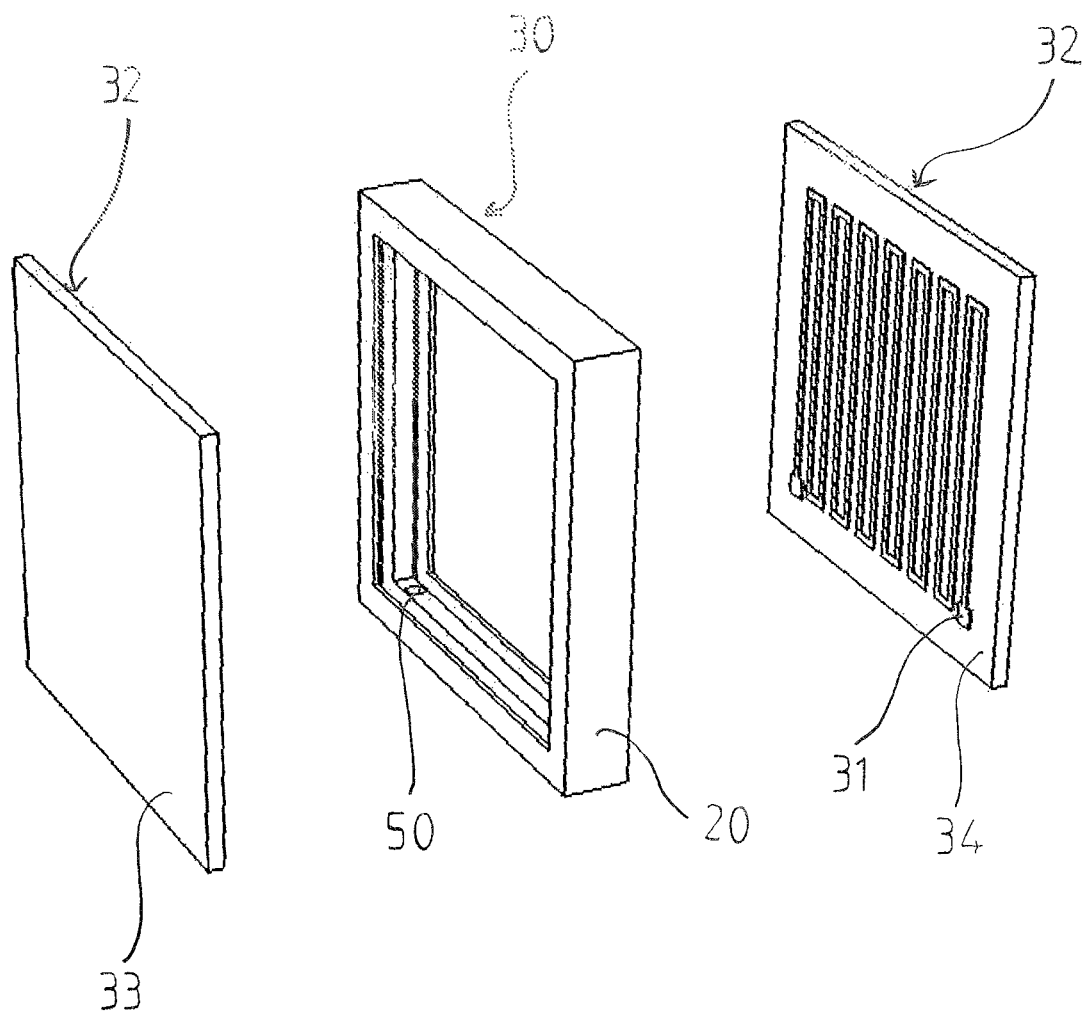

Serigraphed resistance 31 has at least one track forming a pattern on second wall 34 as shown in FIG. 8. The resistance includes a serigraphed track or several tracks forming the pattern. This pattern may for instance form a coil as shown in the illustrated example. It may also form a spiral or a series of concentric or juxtaposed circles, or any other shape.

When electricity is supplied to serigraphed resistance 31, it generates heat which is transmitted to heat diffuser 32 the liquid occupying heating chamber 11.

For example, serigraphed resistance 31 may have between 1300 W and 2500 W thermal power, and more particularly around 1800 W. Advantageously, the thermal conductivity of heat diffuser 32 is above or equal to 10 W/m/K and more particularly between 10 W/m/K and 400 W/m/K. This heat diffuser 32 encourages the transmission of heat between serigraphed resistance 31 and the liquid. Preferably, the heat diffuser 32 is preferred in aluminium, stainless steel, ceramic, enamelled steel or a brass-based alloy. Advantageously, first wall 33 is lined with a food quality lining. The purpose of the heat diffuser is to form the backing to receive serigraphed resistance 31 and to ensure good diffusion of the heat between serigraphed resistance 31 and the liquid.

A particularly advantageous arrangement involves the boiler including the bearing means forming an integral part of the body and shaped to bear on second wall 34 of heat diffuser 32. These bearing means is arranged so as to contribute substantially to the capacity of the boiler to withstand the pressure.

To this end, the bearing means is placed in contact with second wall 34 of heat diffuser 32 at many points, each one of these points contributing to withstand the pressure. Advantageously, at least one of the —support points defines a zone so that it is enclosed, at least in part, by one or several serigraphed tracks 31, 31. Thus, the bearing means is not only arranged on the periphery of the pattern but bears on second wall 34 of heat diffuser 32 inside the pattern itself.

Thus, at least one zone is arranged between two parts of the pattern defined by one or several serigraphed tracks 31, 31. For example, this zone is arranged between two parallel sections defining the coil or between two concentric circles or inside a spiral or between two figures defined by serigraphed tracks, etc.

Advantageously, the bearing means will comprise several zones. In a preferred arrangement, these zones are distributed so as to ensure uniform resistance to the pressure.

Preferably, these zones bear on a surface corresponding to between the 50 and 98% of the surface area of second wall 34 that is not covered by serigraphed resistances 31, 31. These zones may form a continuous zone. They can also form several zones when the resistance defines a closed pattern. In an even more preferred arrangement, the bearing means is arranged so as to be in contact with second wall 34 on an area representing around 98% of second wall 34 not occupied by serigraphed resistances 31, 31. As will be explained hereafter, steps must be taken to ensure that the bearing means does not come into contact with serigraphed resistance 31. Therefore, a minimum clearance will be ensured between the latter and the bearing means. Thus, a significant part of second wall 34 bears on the bearing means and transfers the forces resulting from the pressure of the liquid to the latter.

When the liquid in heating chamber 11 is increased to a relatively high pressure, it applies pressure to walls 15, 15, 16, 36 of this heating chamber 11. The body absorbs some of the force generated by this pressure. First wall 33 of heat diffuser 32 is also subjected to this pressure of the liquid. However, the force generated by this pressure is transmitted from heat diffuser 32 to the bearing means due to the contact between the latter and second wall 34 of heat diffuser 32.

The bearing means and the heat diffuser are arranged, due to their dimensions and their respective elasticity, so that the bearing means absorbs all or at least a substantial part of this force.

Since the bearing means forms an integral part with the body, the body and the bearing means providing most of the resistance to pressure.

Advantageously, a serigraphed resistance 31 is proposed whose dimensions and width of track in particular, and their arrangement, lead to an even distribution of the pressure.

This allows the liquid in heating chamber 11 to be brought to a relatively high pressure, without heat diffuser 32 having to absorb all the forces generated by this pressure. Therefore, a sturdy heat diffuser 32 with high resistance to pressure is not required. Therefore, the invention offers a wide range of choice in the design of the heat diffusers. In particular, this makes it possible to chose heat diffusers with thicknesses and/or made of materials that assist the diffusion of heat between serigraphed resistance 31 and the liquid to be heated. This means that thin-walled heat diffusers may be preferred.

Consequently, the invention improves the thermal conductivity between heating means 30 and the liquid while enabling the pressure of the liquid to be increased to a relatively high level. Therefore, less time is required to heat the water under pressure.

Moreover, when serigraphed resistances 31 are arranged on the periphery of heating means 30, the bearing means limits access to the resistive tracks. Thus, serigraphed resistance 32 is protected and there is less risk of injury by burning. Consequently, the invention improves the safety of known boilers.

Advantageously, it is envisaged that the bearing means comes into contact with a substantial area of heat diffuser 32. To achieve this, the bearing means is shaped to complement serigraphed resistance 31 substantially. Thus, they do not interfere with the serigraphed tracks and are in contact over almost all the surface area of second wall 34 of heat diffuser 32 that is not occupied by serigraphed resistance 31.

FIG. 8 clearly illustrates bearing means with a shape that complements of/matches the shape of the serigraphed resistance 31. This complementary shape may also take the form of a spiral, concentric circles, etc. corresponding to the pattern of serigraphed resistance 31.

Figure 7:
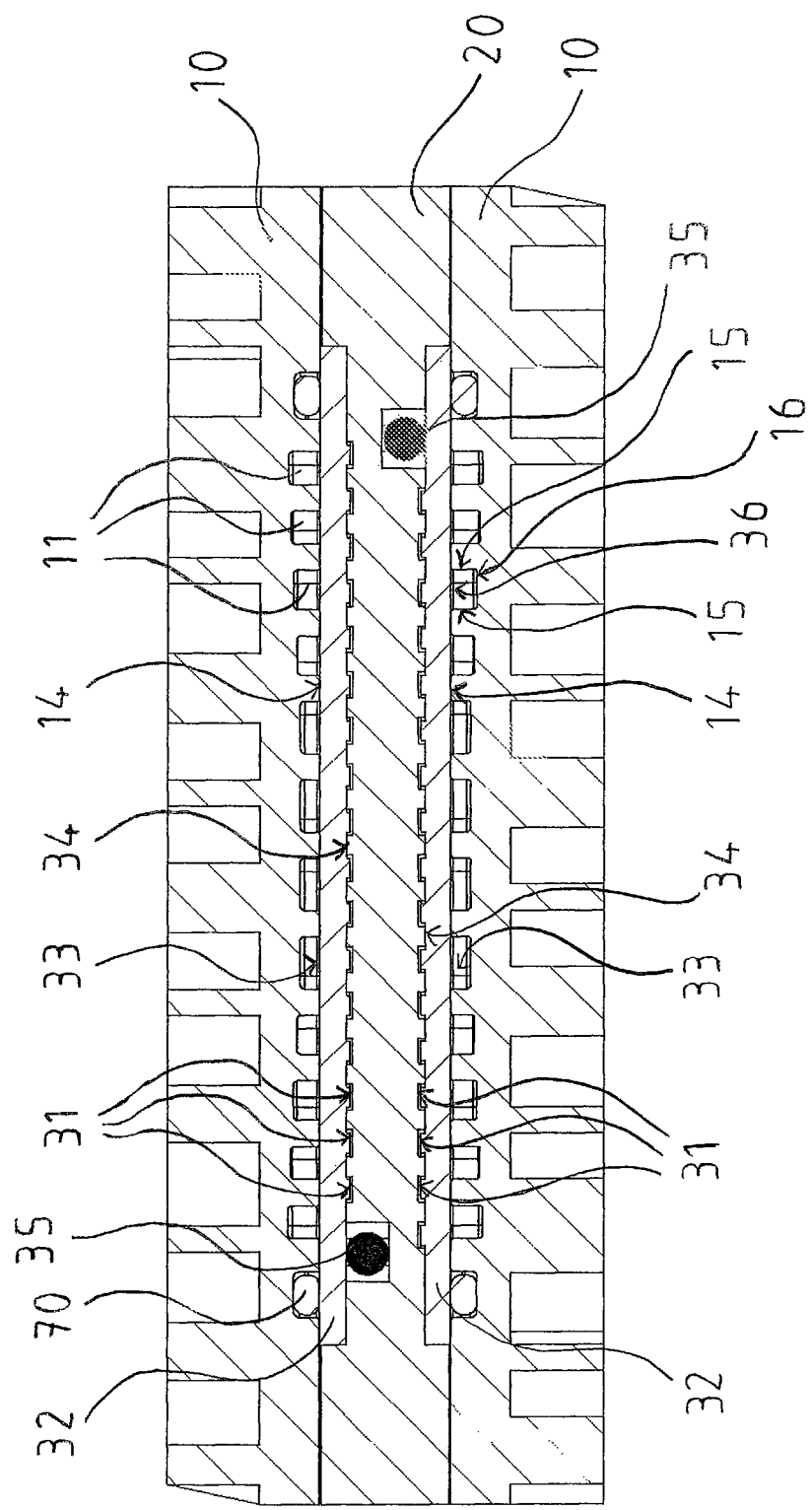
FIG. 7 is a view in perspective of the boiler shown in FIG. 1 according to a plane perpendicular to the mid-plane in FIG. 4.

FIG. 7 also shows the contact zones between the bearing means and heat diffuser 32. For purposes of clarity, serigraphed resistance 31 is shown on this figure as joined to heat diffuser 32. Therefore, the bearing means presents a cavity 22, the bottom of which is arranged a certain distance from the tracks of serigraphed resistance 31. In addition, the upper surface of the bearing means comes into contact with second wall 34 of heat diffuser 32.

The term height designates the dimension of a serigraphed track according to the direction in which it extends from second wall 34 of heat diffuser 32 and in a way that is appreciably perpendicular to second wall 34. Thus, the dimension of a section of the cavity 22 according to this same direction is larger than the height of a track.

In the same way, the width of cavity 22 is greater than the width of a track. These dimensions are selected so that on the one hand the bearing means does not interfere with serigraphed resistance 31 and on the other hand the bearing means remains in contact with a large surface area of second wall 34 while retaining limited occupation of the boiler. Thus, the heat of the resistance is not transmitted by contact between resistance 31 and the bearing means.

Advantageously, the boiler comprises a support 20 which includes the bearing means. This support 20 forms an integral part with the bearing means and thus allows the latter and the body to form an integral and sturdy assembly.

In a variant of the embodiment illustrated on FIGS. 7 and 8, the bearing means forms a single assembly with the support. This variant renders the invention particularly sturdy.

According to another variant of the embodiment, the bearing means is separated from support 20 and arranged in order to be joined to the latter. According to this variant, the boiler includes means for positioning and maintaining in position the bearing means on support 20. These means allow simple interaction between the bearing means by fitting in the support.

According to another variant, the bearing means is formed both by support 20 and by a component added on support 20. Thus, this component and support 20 define separate contact zones with second wall 34 of heat diffuser 32.

The surface area of the bearing means that is to come into contact with second wall 34 of heat diffuser 32 is hereafter designated as the support surface. Advantageously, the support surface is surrounded by a peripheral edge. This peripheral edge is shaped to facilitate the installation of heat diffuser 32 on the bearing means and hold it in position. Indeed, it is important to centre heat diffuser 32 relative to the bearing means in order to avoid the bearing means interfering with the serigraphed resistances. Preferably, the positioning of heat diffuser 32 on the bearing means takes place by simple positioning and fit up.

In an alternative embodiment in which the bearing means is added on to support 20, it is proposed that support 20 bears this edge and is also used to position and maintain the bearing means on support 20. They can then be positioned also by simply fitting together.

Preferably, the bearing means comprises an appreciably flat peripheral support zone intended to come into contact with a complementary peripheral zone on second wall 34 heat diffuser 32. This complementary zone is not equipped with a resistance. It contributes effectively to the transfer of the forces between heat diffuser 32 and the bearing means.

In embodiments in which the heat diffuser is not flat but for instance cylindrical, the support surface and the peripheral support zone also fit into the cylinders.

Thus, the invention ensures that a high-pressure is achieved without having to increase the inertia of the boiler or reduce the diffusion of heat between the resistance and the liquid. Thus, a high temperature and a high-pressure of the liquid can be achieved in a relatively short time.

Preferably, the bearing means will act as heat insulators. Thus, they do not increase the thermal inertia of the boiler and do not absorb part of the heat passing from the resistance to the liquid. For instance, plastic materials capable of withstanding temperatures above 120° C. and with high mechanical strength such as Polysulfones, (PSU) Polyamides (Pa), Polybutylene Teraphtalates (PBT), or any other recognized food quality glass fiber reinforcing may be used for the bearing means.

In the example shown on FIGS. 1 to 8, the boiler is arranged so that heating chamber 11 is positioned on both sides of serigraphed resistance 31. Thus, heating means 30 are situated in the centre of the boiler and heating chamber 11 is arranged on the periphery of heating means 30. Consequently, the differences of temperature between the boiler environment and the boiler surfaces and contact with this environment are less than on known boilers in which serigraphed resistances envelope the heating chamber. There is less heat transfer between the boiler and its environment. Almost all the thermal energy of the heating means is transmitted to the liquid. This improves the thermal efficiency of the boiler.

The body is shaped to ensure that it acts as heat insulation in order to thermally isolate the boiler from its environment. The preferred material will be plastic If, as in the example of an embodiment illustrated on FIGS. 1 to 8, heat diffuser 32 presents the form of a means, heating chamber 11 is arranged so that first wall 33 and second wall 34 are turned to face to heating chamber 11. This creates a "sandwich"-type structure.

Plate type heating means are particularly simple to make and ensure uniform distribution of the temperature.

In the example illustrated on FIGS. 1 to 8, the boiler includes two heat diffusers 32, 32, two walls 34, 34 which are positioned opposite one another. Each one of these second walls 34, 34 include at least one serigraphed resistance 31, 31.

Therefore, serigraphed resistance 31 is covered and enclosed within heating chamber 11. The latter is arranged on both sides of the assembly formed by heat diffusers 32, 32. Serigraphed resistance 31 is placed inside the assembly formed by support 20 and the body. Consequently, the heat is transferred between the boiler and its environment, which improves the thermal efficiency of the boiler.

In the example illustrated on FIGS. 1 to 8, support 20 includes at least one central zone to accommodate the bearing means and at least one heat diffuser 32. It also includes the peripheral zone arranged around the central zone.

This characteristic is shown on the FIG. 8. The peripheral zone of the support is intended to receive part of the body. Therefore, internal face 14 of the body is arranged in contact with first wall 33 of heat diffuser 32 so as to define the heating chamber 11 with the latter. This peripheral zone contributes to the joining of the body on support 20. It also contributes advantageously to the centring of the body relative to support 20.

In the examples shown on FIGS. 1 to 8, the body breaks down into two plates 10, 10 each one designed to be associated with heat diffuser 32 in order to define the heating chamber. Each plate 10 has an outer face and an inner face 14, the surround of which bears on the peripheral zone of support 20. Advantageously, each plate 10 is arranged to act as thermal insulation. The preferred material will be plastic.

The boiler comprises removable fixing means arranged to allow removable joining and separation of flange 10 on support 20. In the example of embodiment shown, the removable means of fixing comprise connecting screws 60—nuts 61.

To this end, the external face of each flange 10 has support zones to receive and allow unrestricted access to a screw head and to support zones to receive bolts intended to be respectively associated with a screw whose head bears on the external face of flange 10 opposite.

Heating means 11 include at least one thermostat 35. The purpose of this thermostat 35 is to limit the temperature of heat diffuser 32. This prevents the latter reaching a destructive temperature. It also prevents parts, especially in plastic materials placed in contact with it, from reaching a destructive temperature. Each thermostat 35 is incorporated removably in a housing provided in the support or in the bearing means. It comes into contact with an electrical circuit associated with serigraphed resistance 31 by simply fitting heat diffuser 32 into the bearing means or into support 20. In particular, a fusible device may be used. A thermostat may be advantageously provided for each serigraphed resistance. This characteristic is shown on FIG. 8.

To illustrate the invention, a boiler according to the example described above has the following characteristics:

2 mm thickness heat diffuser of approximately 58 $cm^2$ and surface defined by the circumference of the pattern: approximately 43 $cm^2$ surface of the peripheral support zone: approximately 15 $cm^2$ surface of first wall 33 in contact with water: 32.4 $cm^2$ on a total area of 58 $cm^2$, that is to say approximately:

a boiler thickness of approximately 33 mm appreciably square external shape measuring approximately 100 mm per side around 1500 W power.

This type of boiler is capable of easily bringing 8.6 cm3 of water from 20° C. to 95° C. in less than 10 seconds.

The support includes fluid connections 40, 40 arranged so that the liquid flows into the heating chamber and liquid flows out of the heating chamber.

In an advantageous arrangement, the fluid connection between the boiler and a hydraulic circuit of the apparatus for preparing hot beverages takes the form of a connection of the boiler in complementary means for fluid connection connected to the apparatus. The fluid connection means are arranged so that the joining of the boiler to the machine for preparing beverages involves the fluid connection of the fluid connection means to the additional fluid connection means. Preferably, the fluid connection means include a male part equipped with o-rings 71. These male parts are to be inserted respectively into a female part on the complementary means for fluid connections.

The boiler also includes electrical connection means arranged to enter into contact with the complementary electrical connection means joined to the machine for preparing beverages in order to supply the boiler with electricity. These electrical connection means comprise three electrical connectors 50, 50, 50. The electrical connection means are arranged so that when the boiler is joined to the apparatus for preparing beverages, the electrical connection means come into contact automatically with the complementary electrical connection means.

Thus, assembly of the boiler on the equipment automatically establishes a fluid connection and electrical connection between the boiler and the fluid supply and electrical power supply respectively.

Consequently, assembling the boiler in the machine for preparing beverages is particularly simple since it is executed in a single operation by the user. Therefore, the invention offers considerable modularity since the boiler can be dismantled and reassembled easily. In addition, it guarantees a high degree of safety since once separated from the apparatus, the boiler is no longer connected electrically to a power supply thereby eliminating any risk of electrical shock or unintentional activation of the serigraphed resistances.

The means for making the fluid connection comprise an incoming pipe 41 and an outgoing pipe 41. The pipes are housed in support 20. In a preferred arrangement, they are positioned in the mid-plane of support 20. One of the ends of each of these pipes emerges outside the boiler and the other of these ends opens into an intermediate pipe 13 housed in the body. One end of each intermediate pipe 13 opens into the heating chamber 11. Advantageously, the section of each intermediate pipe 13 increases between intake pipe 41 and the heating chamber in order to compensate for the expansion of the fluid due to its temperature increase between intake pipe 41 and heating chamber 11.

Support 20 is symmetrical relative to a mid-plane. Moreover, all the boiler is symmetrical relative to this same plane. It also has a second symmetrical plane perpendicular to the mid-plane.

This symmetry limits the number of different parts and therefore the number of parts for the boiler. Indeed, the boiler mainly consists of a support 20, two plates 10, 10, two heat diffusers 32, 32, each one associated with a serigraphed resistances 31, 31, two peripheral seals 70, 70 and two thermostats 35, 35. This symmetry also makes it much easier to assemble and dismantle the boiler. Indeed, the following parts may be positioned on either side of support 20: plate 10, heat diffuser 32, thermostat 35, peripheral seal 70, screw 30/nut 61. This reduces the complexity of assembly and the costs of obtaining parts. This symmetry also simplifies assembly and dismantling of the boiler on the remainder of the machine for preparing beverages. In fact, each of the male parts of the fluid connection means may be connected indifferently to an intake or an outlet on the equipment fluid supply network.

This means that there is no preferred direction for assembling the boiler on the equipment. Servicing and dismantling the boiler at the end of its service life are greatly simplified since each part can be easily dismantled or interchanged.

Advantageously, the circulation channel consists of a pattern of parallel straight sections.

Preferably, the boiler is arranged so that when in service the straight sections of the circulation channel are generally positioned vertically. Thus, if either the boiler intake or outlet or if both intake 40 and outlet 40 are disconnected from the other parts of the machine's hydraulic circuit, only the few sections connected directly to these intakes/outlets will empty. Indeed, when a channel intake 40 or outlet 40 is disconnected from the machine's hydraulic circuit, the water contained in a section will escape through this opening. It will then be replaced by air. This air would then be stopped at the channel forming a connection between the two upper ends of consecutive sections. Indeed, the density of the air prevents this air from descending along the next section. The advantage of this characteristic is that even when works on the machine require that its hydraulic circuit is opened or the boiler is disconnected in part at least from this circuit, the boiler does not entirely drain. This enables the boiler to be withdrawn entirely from the machine without this leading to automatic drainage. Therefore, as soon as the boiler is reconnected to the machine, heating means 30 will already be in contact with the water trapped in the boiler. This lessens the risks of overheating. There is no need to refill the boiler before obtaining hot water.

The length of the circulation channel is defined by the distance that a given volume of fluid travels from the channel intake to the channel outlet. The length of the channel conditions the time that the liquid takes to travel through the boiler and therefore to transfer the heat to the liquid. Moreover, it conditions the surface occupied by the channel and therefore the dimensions of heating chamber 11 and the boiler.

Advantageously, the section of the circulation channel on a plane that is appreciably perpendicular to its direction of flow along the parallel sections varies between the circulation channel intake and at least half its length.

As illustrated of FIG. 7, the dimensions of cross walls 16, 36 increase from the intake to at least the middle of the length of the channel. The channel section retains an appreciably constant area, thereby ensuring that the flow of the liquid remains constant. Consequently, the dimension of sidewalls 15, 15 is adapted according to the changing dimensions of cross walls 16, 36.

Cross wall 36 that forms the interface between the circulation channel and heat diffuser 32 makes a significant contribution to the heat exchanged between heat diffuser 32 and the fluid. Hence, the larger this cross wall 36, the more heat is transferred to the liquid.

In fact, the quantity of heat transferred also depends on the temperature differential between second wall 34 of heat diffuser 32 and the liquid. The smaller this differential, the less the quantity of heat exchanged.

As a result, this particular configuration of the channel fosters the transmission of heat from a serigraphed resistance 31 to the liquid although its temperature increases.

According to a non-illustrated embodiment, the dimension of the cross wall increases from the intake up to the exit from the circulation channel.

In the example illustrated, in a particularly advantageous arrangement, the dimension of the cross walls increases from the circulation channel intake to the middle of its length. This dimension decreases from half its length onwards. The channel is perfectly symmetrical on a plane so that no matter what the direction used to assemble the boiler, the circulation channel will present the same configuration. In particular, each of pipes 41, 41 at the ends of the circulation channel may be positioned either on an intake or an outlet from the fluid supply circuit on the machine.

A variant to the previously described embodiment provides that support 20 and flanges 10, 10 constitute a single assembly. An opening is then provided in this single assembly in order to insert heating means 30. According to this variant, the body includes a cover that closes the opening tightly.

Other embodiments will now be described. These embodiments apply all the characteristics of the example of the boiler described previously, the only differences being the characteristics mentioned below.

In particular, in each of these embodiments, the boiler includes means for heat diffuser 32 to bear on second wall 34 and to absorb the pressure present inside heating chamber 11.

On the embodiments shown on FIGS. 9 to 13, the body forms a tight containment inside which are housed heating means 30. These are enclosed by heating chamber 11.

Support 20 forms a frame receiving two heat diffusers 32, 32. The body includes the joining means capable of interacting with heating means 30 in order to enable removable joining of the latter inside the body. To do this, two slides are arranged to ensure translatory guidance of heating means 30 and to position the latter on the body. These slides are arranged so as not to come into contact with the heating elements but to interact for example with support 20.

The frame may itself constitute the bearing means. It may also consist of openwork, as illustrated. In this case, it is configured to house the bearing means added inside the frame. These bearing means interacts with the frame in order to transfer to it the force due to the pressure generated by the liquid.

Figure 12:
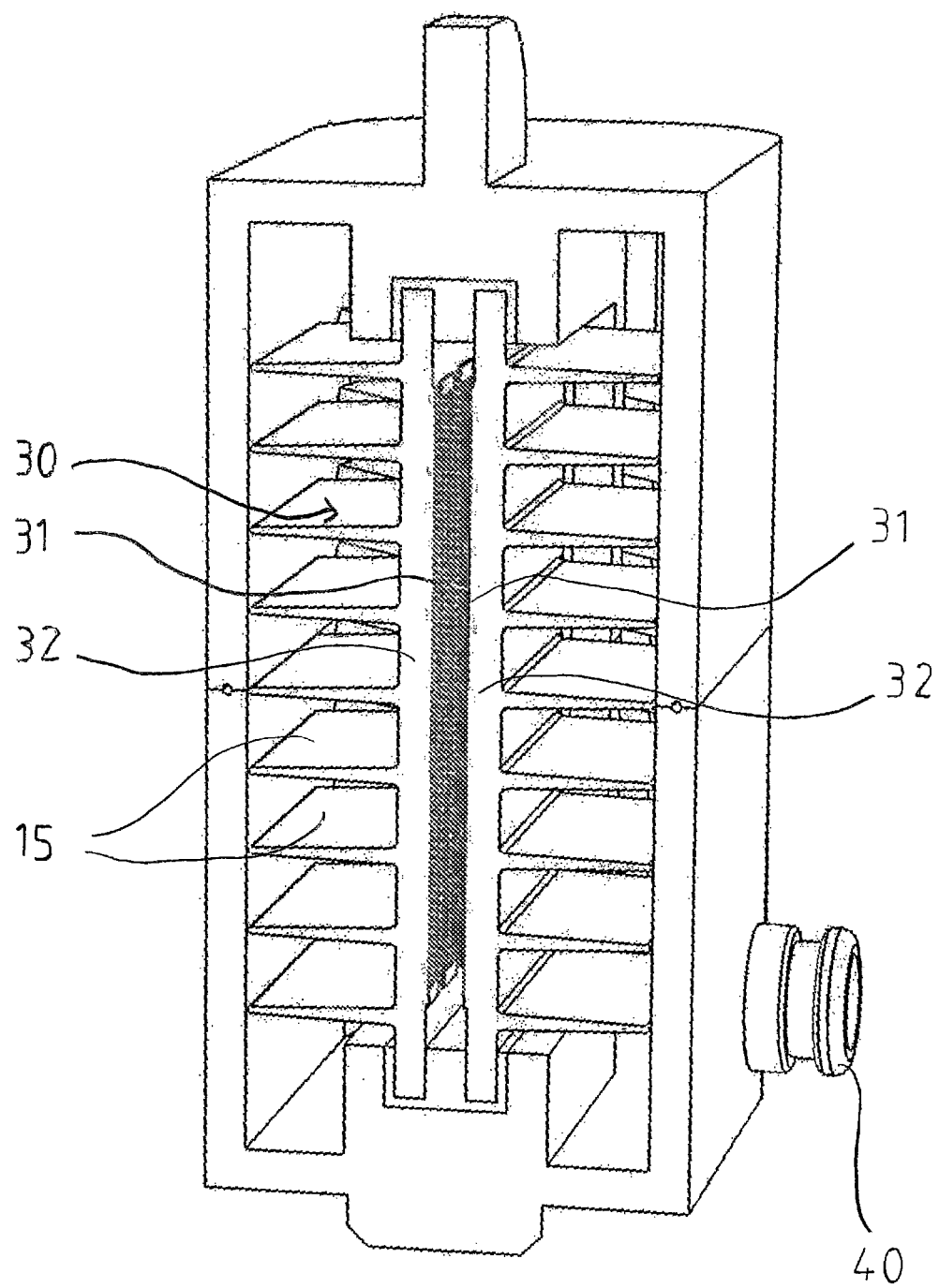
FIGS. 12 and 13 are views in perspective of another example of the invention.
Figure 13:
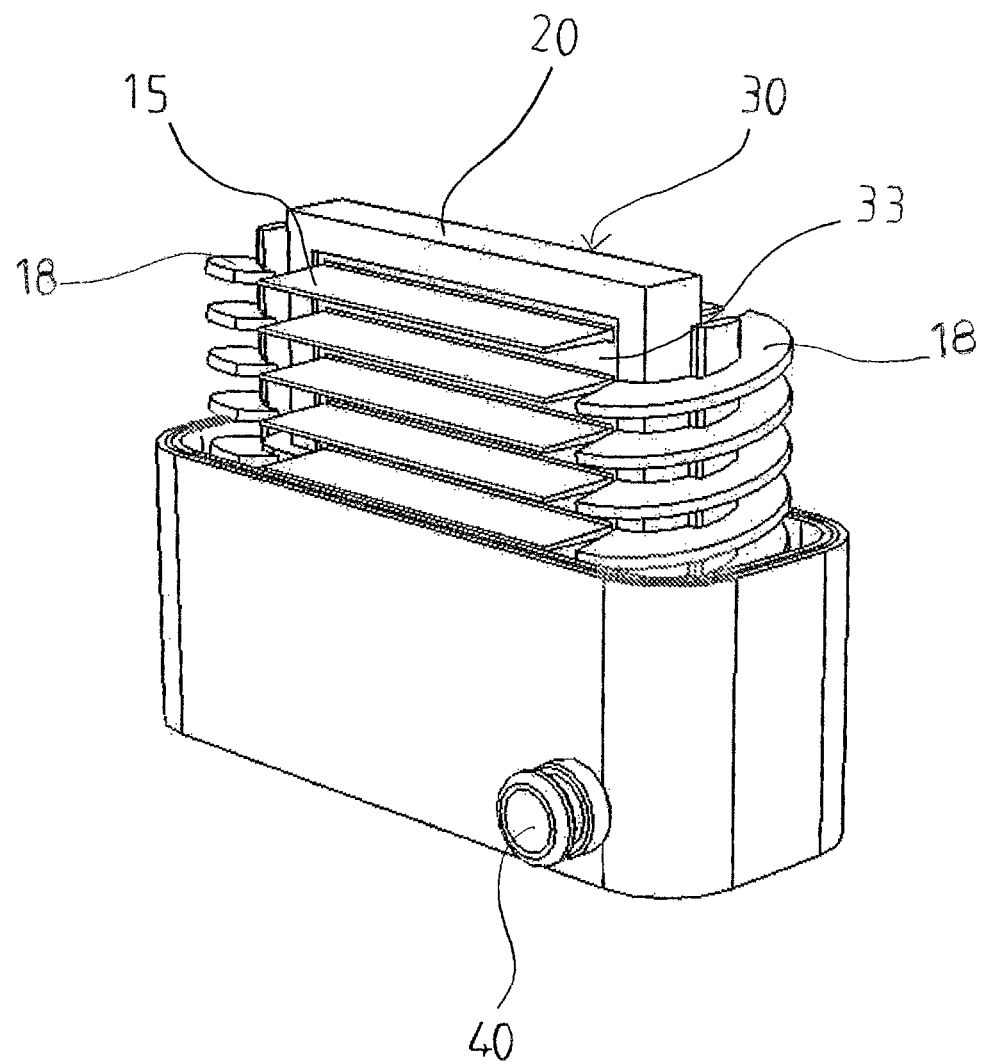

The embodiment illustrated on FIGS. 12 and 13 constitute a variant of the previous embodiment. According to this embodiment, heating means 30 include fins designed to act as side walls 15 in order to channel the flow of the liquid. Moreover, they also increase the heat exchanger surface between the heating elements and the liquid. These fins are fitted on heat diffuser 32 and extend roughly perpendicular thereto.

This embodiment makes a notable increase to the heat exchanged between heating means 30 and the liquid. Heating of the latter therefore takes place quickly and uniformly.

FIG. 13 shows a variant to the example shown in FIG. 12.

In this variant, the boiler comprises two sections 18, 18. Sections 18, 18, fins 15, heat diffuser 32 and the body are arranged so as to define the circulation channel for the liquid. This channel defines a helicoidal spiral with vertical axis able to guide the liquid from intake 40 towards outlet 40 of boiler 1. By channelling towards the liquid outlet, this type of boiler optimizes the circulation of the latter and tends to increase heat exchanges.

A plastic material is preferred for the section. The section may be fastened removably on the body, on heating means 30 or on support 20.

According to another embodiment not shown, the body is cylindrical, with circular or polygonal section. Moreover, the heating means are housed inside the body. They are appreciably cylindrical and present a section that substantially matches that of the body. Thus, the body acts as a sleeve around the heating means. The heating chamber is on both sides of the heating means and encloses the serigraphed resistance.

Only one heat diffuser may be provided on which are fitted one or several serigraphed resistances. Several heat diffusers may also be provided, arranged so as to form a cylinder.

In each of these embodiments, the channel sidewalls may be supported either by is heat diffuser 32 or by the body.

The boiler according to the invention includes sealing means comprising at least one peripheral seal 70 arranged to ensure the tightness of heating chamber 11. Preferably, seal 70 is positioned between inner face 14 and the first wall 33 of heat diffuser 32. It is placed over all the periphery of heating chamber 11. Thus, the liquid remains confined between inner face 14 of the body and first wall 33 of heat diffuser 32. This prevents it reaching second wall 34 of heat diffuser 32 and coming into contact with serigraphed resistance 31 or with the electrical connections between serigraphed resistance 31 and an electrical power supply. This arrangement provides a particularly effective seal that is both safe and simple to install. In particular, it facilitates the assembly of the electrical connection means.

Advantageously, for a plate-shaped heat diffuser 32, peripheral seal 70 has rectangular or circular shape around the pattern formed by serigraphed resistance 31.

For a heat diffuser with cylindrical shape, the sealing means consist of two seals with section that is appreciably identical to that of the heat diffuser and is installed along the cylinder axis on both sides of the serigraphed resistance.

In a particularly advantageous arrangement, the boiler is shaped so that the forces generated by the pressure of the liquid in each of the two heating chambers balance. Indeed, the two heat diffusers (32) and the bearing means are enclosed between two heating chambers and are therefore subjected to the forces generated by each one of these two volumes. These forces are in identical directions, that is to say a direction that is appreciably perpendicular to the surface of the heat diffuser. When using only one heat diffuser (32) in the form of a flat plate, this direction is perpendicular to the plate. In the case of one heat diffuser (32) in the form of a cylinder, this direction is substantially radial. These forces are in opposite directions. Moreover, the heating chambers are arranged so that the pressure forces generated are of the same intensity.

The forces created by the pressure are therefore cancelled out at the bearing means. Therefore, there is no need for the latter to have substantial rigidity. The invention is therefore able to overcome the mechanical stresses created on the bearing means. This makes it possible to limit the thickness of the bearing means and/or choose materials with low rigidity. In particular, materials with high insulating capacity such as PTFE will be used. Silicon may also be chosen, a material that is usually unsuitable for this type of use since extremely flexible. When this bearing means is made of thin silicone, they quickly reach their elastic limit when subjected to the pressure of the liquid. The boiler is then rigid and the heating chamber is perfectly isolated thermally.

Moreover, this balancing of the forces due to the pressure leads to a considerably simplified structure of the boiler since no structure is needed to absorb the forces due to the pressure transmitted to the bearing means. In fact, only the body of the boiler absorbs the pressure forces. This significantly improves the compactness and sturdiness of the boiler.

The bearing means may only include a single support 20, two side-by-side supports, or two supports enclosing an intermediate component.

This specific nature of the invention applies to all the forms of the heat diffuser and the heating chamber. It applies in particular to the heat diffusers and to the flat or cylindrical heating chambers. It also applies to the boilers comprising a single heating chamber arranged on both sides of the bearing means. Advantageously, it applies to boilers with a symmetry on both sides of the bearing means.

For each of the embodiments given as examples, sidewalls 15 defining the circulation channel can be installed either on heat diffuser 32 or on the body.

Advantageously, for each of these embodiments, the body encloses the heating means and constitutes an effective protection against damage to the latter and against the risks of accidental burning.

A boiler according to the invention uses a small quantity of metal. This quantity of metal corresponds mainly to the heat diffuser and to the connectors. Therefore, this invention limits the weight of the boiler and reduces the material and transport costs induced by the use of metal. In fact, the cost of transport is particularly high in eco-design terms since the boiler has to be separated from the other parts of the equipment so that it can be sent to a maintenance centre during its service life.

For each one of these embodiments, the boiler is arranged so that it is perfectly easy to assemble. Certain parts are assembled by simply fitting together (heat diffuser and support for instance). Moreover, click-lock means of assembly may be provided in order to overcome the need for any tools or screw tightening operations to join the plates on the support.

The present invention is not limited to the embodiment described above but extends to any embodiment that conforms to its spirit.

In particular, the invention is not limited to boilers with two plate-shaped distributors.

References

10. Flange
11. Heating chamber
12. Compartment
13. Intermediate pipe
14. Internal face
15. Sidewalls
16. Second transversal wall
18. Section
20. Support
22. Void
30. Heating means
31. Serigraphed resistance
32. Heat diffuser
33. First wall
34. Second wall
35. Thermostat
36. First transversal wall
40. Distribution channel input/output
41. Intake/exit pipe
50. Electrical connectors
60. Bolt
61. Nut
70. Peripheral seal
71. o-ring

The invention claimed is:

1. Boiler for use on a machine for making hot beverages, comprising:
    a heat diffuser comprising a first wall configured to be placed in contact with a liquid to be heated and a second wall opposite the first wall;
    a heater comprising at least one serigraphed or photo-engraved resistance arranged on the second wall of the heat diffuser and forming a pattern comprising one or more resistive track;
    a body, which with the first wall of the heat diffuser, defines a heating chamber inside which the liquid is to be heated;
    a support joined to the body; and
    a bearing, arranged to bear on at least one zone of the second wall of the heat diffuser,
    the one or more resistive track being arranged on each side of the at least one zone so that said at least one zone which bears the bearing is arranged between at least two parts of the pattern defined by the one or more resistive track, and
    the bearing being attached to the support or being integral with the support so that the bearing absorbs at least part of the force transmitted by the liquid to the heat diffuser and resulting from pressurizing of the liquid being heated in the heating chamber, and the bearing transfers at least part of said force to the support and to the body to which the support is joined.

2. The boiler according to claim 1, wherein the shape of said bearing appreciably complements the serigraphed or photo-engraved resistance so as to come into contact with the second wall of the heat diffuser without interfering with the resistive tracks.

3. The boiler according to claim 1, wherein the bearing is arranged so that the at least one zone occupies an area greater than 50% of the area of the second wall that is not occupied by the serigraphed or photo-engraved resistance.

4. The boiler according to claim 1, wherein the bearing is arranged so that the at least one zone occupies an area of between 80% and 98% of the area of the second wall that is not occupied by the serigraphed or photo-engraved resistance.

5. The boiler according to claim 1, further comprising a support that acts as a frame and receives the bearing.

6. The boiler according to claim 4, wherein the bearing is integral with the support.

7. The boiler according to claim 1, wherein the heating chamber is arranged on the periphery of the heater and the heater is arranged on the periphery of the bearing.

8. The boiler according to claim 1, wherein the heater is arranged on the periphery of the heating chamber and the bearing is arranged on the periphery of the heater so as to enclose the heater.

9. The boiler according to claim 1, wherein the heater has a roughly cylindrical shape.

10. The boiler according to claim 1, comprising at least two heat diffusers whose second walls are turned mutually towards one another and enclose the bearing.

11. The boiler according to claim 1, wherein the boiler is symmetrical relative to a mid-plane.

12. The boiler according to claim 1, wherein
    the heat diffuser has a thickness between 2 mm and 4 mm,
    the pattern defines an area that is between 60% and 90% of the surface area of the heat diffuser, and
    interaction between the bearing and the body enables the pressure of the liquid in the boiler to reach 30 bars.

13. The boiler according to claim 1, arranged so that the forces generated by the pressure of the liquid being heated are transmitted to the bearing and balance at the level of the bearing.

14. The boiler according to claim 13, comprising two heat diffusers, wherein the bearing is inserted between the two second walls of each heat diffuser.

15. A machine for preparing hot beverages equipped with the boiler according to claim 1.

16. The boiler according to claim 2, wherein the bearing is arranged so that the at least one zone occupies an area greater than 50% of the area of second wall not occupied by the serigraphed or photo-engraved resistance.

17. The boiler according to claim 2, wherein the bearing means is arranged so that the at least one zone occupies an area of between 80% and 98% of the area of the second wall that is not occupied by the serigraphed or photo-engraved resistance.

18. The boiler according to claim 1, wherein the bearing is arranged so that the at least one zone occupies an area of between 80% and 98% of the area of the second wall that is not occupied by the serigraphed or photo-engraved resistance.

19. The boiler according to claim 2, further comprising a support that acts as a frame and receives the bearing.

20. The boiler according to claim 3, further comprising a support that acts as a frame and receives the bearing.

\* \* \* \* \*